E. L. SHIPP.
GREASE CUP.
APPLICATION FILED FEB. 3, 1917.
1,239,311. Patented Sept. 4, 1917.
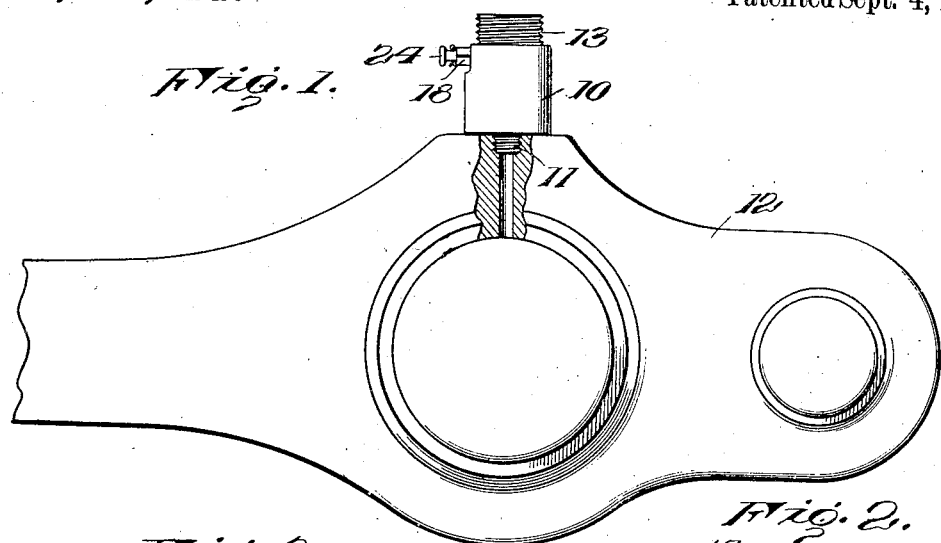
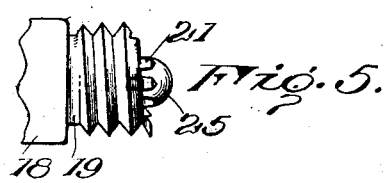
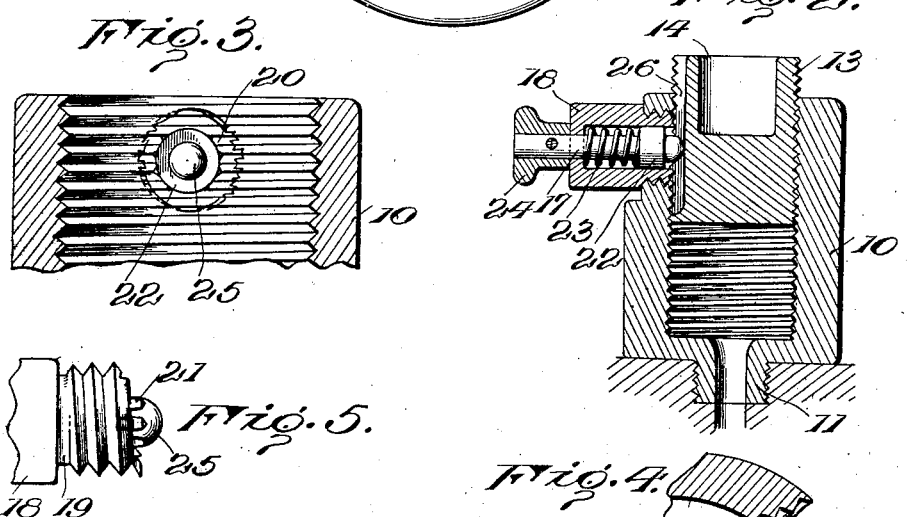
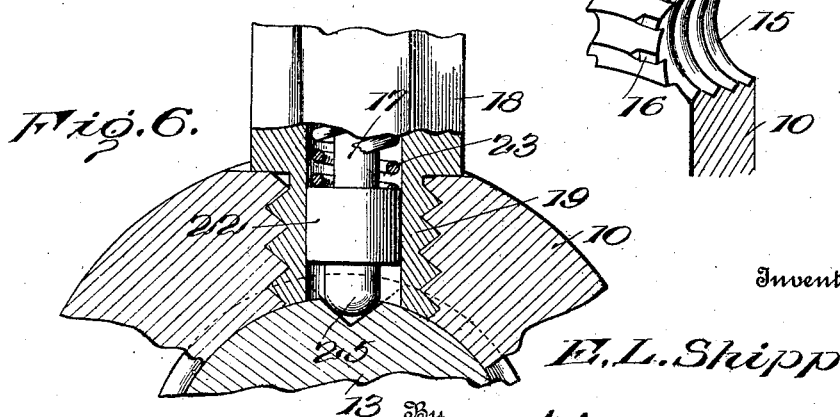
Inventor
E. L. Shipp.
By
Attorneys.

UNITED STATES PATENT OFFICE.

EDWARD L. SHIPP, OF PRINCETON, WEST VIRGINIA.

GREASE-CUP.

1,239,311.   Specification of Letters Patent.   Patented Sept. 4, 1917.

Application filed February 3, 1917. Serial No. 146,423.

*To all whom it may concern:*

Be it known that I, EDWARD L. SHIPP, a citizen of the United States, residing at Princeton, in the county of Mercer and State of West Virginia, have invented certain new and useful Improvements in Grease-Cups, of which the following is a specification.

This invention relates to an improved grease cup especially designed for use upon heavy machinery or in any instance where excessive vibration occurs and has as its primary object to provide a device of this character wherein the separable parts thereof will be locked upon the cup body so that the said parts cannot become accidentally loosened to fly off in the practical use of the cup.

The invention has as a further object to provide a device of this character employing a cup body having a plunger adjustable therein for forcing a lubricant from the cup and wherein the said plunger will be held locked against accidental displacement.

And the invention has as a further object to provide a locking pin or key for holding the plunger at adjustment and wherein the casing for the said pin will be locked upon the cup body by the plunger so that the said casing with the pin cannot become accidentally displaced.

Other and incidental objects will appear as the description proceeds and in the drawings wherein I have illustrated the preferred embodiment of the invention and wherein similar reference characters designate corresponding parts throughout the several views:

Figure 1 is a side elevation showing my improved grease cup applied to a conventional type of connecting rod with a portion of the rod broken away to show the manner in which the grease from the cup is fed to the adjacent journal of the rod, Fig. 2 is a sectional view showing the mounting of the plunger within the cup body as well as the mounting of the locking pin or key for the said plunger, Fig. 3 is a transverse sectional view on a slightly enlarged scale showing the cup body with the plunger removed and illustrating the disposition of the threads upon the inner end of the casing for the locking pin to coincide with the threads upon the interior of the cup body, Fig. 4 is a fragmentary perspective view showing the bore through the cup body for receiving the inner terminal of the casing for the locking pin and illustrating the manner in which the threads upon the inner side of the cup body are cut away at opposite sides of said bore for receiving the terminals of the threads upon the inner end of the casing, Fig. 5 is a fragmentary side elevation showing the inner extremity of the casing for the locking pin and illustrating the manner in which the terminals of the transverse threads upon the inner end thereof are arranged to project from the inner terminal of the said casing, and Fig. 6 is a fragmentary sectional view illustrating the manner in which the projecting terminals of the transverse threads of the locking pin casing are arranged to fit within the recesses or cut away portions in the threads upon the interior of the cup body with the threads of the plunger mating therewith for locking the casing for the said pin upon the cup body.

In carrying out the invention, a hollow cup body 10 is employed which is provided at its lower extremity with an exteriorly threaded extension 11 by which the device may be mounted in position and formed through the said extension is a discharge outlet for the cup body. In Fig. 1 of the drawings, I have illustrated the device in connection with a conventional type of connecting rod 12, the extension 11 of the cup body being screw threaded into the upper end of a grease channel leading through the said rod to the adjacent journal thereof. The cup body 10 is interiorly screw threaded to adjustably receive an exteriorly screw threaded plunger 13 having a socket 14 formed in the upper end thereof to receive any suitable type of tool for rotating the said plunger. As will be clear, a lubricant or grease within the cup body will be expelled therefrom when the plunger 13 is adjusted inwardly within the cup body. Formed through one side of the cup body, adjacent its upper extremity, as particularly shown in Fig. 4, is a screw threaded bore 15. Upon opposite sides of this bore, the confronting ends of the screw threads upon the interior of the cup body are cut away or recessed as shown at 16.

Mounted to coöperate with the plunger 13 is a locking pin or key 17 therefor. This pin is slidably fitted through a casing 18 having a reduced extension 19 screw threaded into the bore 15 of the cup body. The extension 19, upon its inner terminal, is formed with a plurality of transverse threads 20 formed, as particularly shown in Fig. 5, with laterally projecting overhanging outer terminals 21. When the casing 18 is rotated to seat against the cup body 10, as illustrated in Fig. 6, the overhanging terminals 21 of the threads 20 are moved to seat within the recesses or cut away portions 16 of the adjacent threads upon the inner face of the cup body with the threads 20 coinciding therewith and bearing between the threads upon the plunger 13. Consequently, when the plunger is in position within the cup body, the said plunger will act to engage by the threads thereof with the inner terminal of the extension 19 of the casing 18 for locking the casing against accidental displacement from the cup body.

The pin 17 is provided, adjacent its inner extremity with an annular shoulder or enlargement 22 and bearing between this shoulder and the outer end of the casing is a helical spring 23 surrounding the said pin. Connected to the outer terminal of the pin by a key or other suitable fastening device, is a knob 24. The inner extremity of the pin 17 is formed with a rounded terminal 25 and, as will be readily understood, the spring 23 will normally act upon the pin to project the terminal 25 thereof into the cup body for engagement with the plunger 13. This plunger, upon one side thereof, is formed with a longitudinally extending V-shaped groove 26 to receive the terminal 25 of the pin. Consequently, by grasping the knob 24 and retracting the pin, the plunger may be readily rotated within the cup for expelling the grease therefrom and the pin then released to engage within the groove 26 for locking the plunger at adjustment and at the same time, also locking the said plunger against accidental displacement from the cup body. In thus locking the plunger within the cup body by the pin 17 with the plunger in turn locking the casing of the pin upon the cup body, all of the separable parts connected to the cup body are locked in engagement therewith. I thus provide a grease cup particularly adapted for use upon heavy machinery or elements subject to intense vibration, since the parts of the cup cannot become jarred loose to be thrown from the cup body in the practical use of the device.

Having thus described the invention, what is claimed as new is:

1. A device of the character described including a cup body, a plunger adjustable therein, locking means for holding the plunger at adjustment, and means carried by the plunger and operatively engaged with the said locking means for locking the said locking means upon the cup body.

2. A device of the character described including a cup body, a plunger adjustable therein, a radial locking pin for holding the plunger at adjustment, means connecting the said pin with the cup body, and means carried by the plunger and operatively engaged with the said connecting means for locking the connecting means upon the cup body.

3. A device of the character described including a cup body, a plunger adjustable therein, a casing connected to the cup body, a locking pin connected to the casing for engagement with the plunger to lock the plunger at adjustment, and interlocking means between the plunger and the casing for locking the casing upon the cup body.

4. A device of the character described including a cup body, a plunger having screw threaded adjustment therein, a casing mounted upon the cup body, and a locking pin connected to said casing for engagement with the plunger for locking the plunger at adjustment, the plunger having screw threaded engagement with the casing for holding the casing against rotation and locking the said casing upon the cup body.

5. A device of the character described including an interiorly screw threaded cup body, an exteriorly screw threaded plunger adjustable therein, there being a screw threaded bore entering through one side of the cup body with the terminals of the screw threads of the cup body confronting said bore at opposite sides thereof cut away, a casing having an extension screw threaded into said bore, transverse screw threads formed on the inner end of said extension and provided with overhanging terminals engaging in the cut away portions of the said thread terminals with the said transverse threads mating with the threads upon the interior of the cup body to bear between the threads of the plunger, and a locking pin connected to said casing for engagement with the plunger to lock the plunger at adjustment with the plunger acting to lock the casing upon the cup body.

6. A device of the character described including a cup body, a plunger rotatably adjustable therein, a casing extending into the cup body, means carried by the casing and engaged with the plunger for holding the plunger at adjustment, and interlocking means between the plunger and the inner end of the casing for locking the casing and the said means upon the cup body.

In testimony whereof I affix my signature.

EDWARD L. SHIPP. [L. S.]

Copies of this patent may be obtained for five cents each, by addressing the "Commissioner of Patents, Washington, D. C."